United States Patent
Kurokawa (10) Patent No.: US 6,378,057 B1
(45) Date of Patent: *Apr. 23, 2002

(54) DATA PROCESSING APPARATUS

(75) Inventor: Masuyoshi Kurokawa, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/085,434

(22) Filed: May 27, 1998

(30) Foreign Application Priority Data

May 28, 1997 (JP) .............................. 9-138333

(51) Int. Cl.[7] .............................................. G06F 12/00
(52) U.S. Cl. ......................................... 711/200; 710/57
(58) Field of Search ................................ 711/200, 212, 711/220; 710/57

(56) References Cited

U.S. PATENT DOCUMENTS 5,586,281 A * 12/1996 Miyama et al. .............. 395/405
5,796,978 A * 8/1998 Yoshioka et al. ............ 395/416
5,956,517 A * 9/1999 Okamoto et al. ....... 395/800.01
6,115,761 A * 9/2000 Daniel et al. ................. 710/57

* cited by examiner

*Primary Examiner*—Matthew Kim
*Assistant Examiner*—Pierre M Vital
(74) *Attorney, Agent, or Firm*—Frommer Lawrence & Haug LLP; William S. Frommer; Darren M. Simon (57) ABSTRACT

The present invention relates to a data processing apparatus which allows a memory to be used as a line FIFO. A write port address modification information generating unit and a read port address modification information generating unit carry out storing, addition and comparison on a variety of values. A write address modifying circuit compares a value generated by the write port address modification information generating unit with a memory write address output by a program memory, performing addition and selection in order to supply a modified memory write address to a data memory unit. By the same token, the read port address modification information generating unit and a read address modifying circuit carry out operations similar to those performed by the write port address modification information generating unit and the write address modifying circuit. Values output by the write port address modification information generating unit and the read port address modification information generating unit are also supplied to a flag setting/resetting circuit. When an operation to write or read out data into or from the data memory unit, flags generated by the flag setting/resetting circuit are examined.

10 Claims, 11 Drawing Sheets

FIG. 1
(PRIOR ART)

SAM : serial access memory

DATA PROCESSING APPARATUS

BACKGROUND OF THE INVENTION

Description of the Related Art

As a data processing apparatus related to the present invention, there is a processor called a SVP (Serial Video Processor) described in Section 3.1 on Page 17 of the IEEE 1990 CUSTOM INTEGRATED CIRCUITS CONFERENCE. Composed of 1,024 processors integrated in a single chip, the SVP is a processor for carrying out real time digital processing on a video signal. The SVP has a SIMD (Single Instruction stream/Multiple Data stream) structure which allows pixel data on a horizontal scanning line to be processed concurrently. SIMD is the name of one of data processing methods adopted by a computer whereby data of different kinds is processed concurrently as if the data pertained to 1 job.

Figure 1:
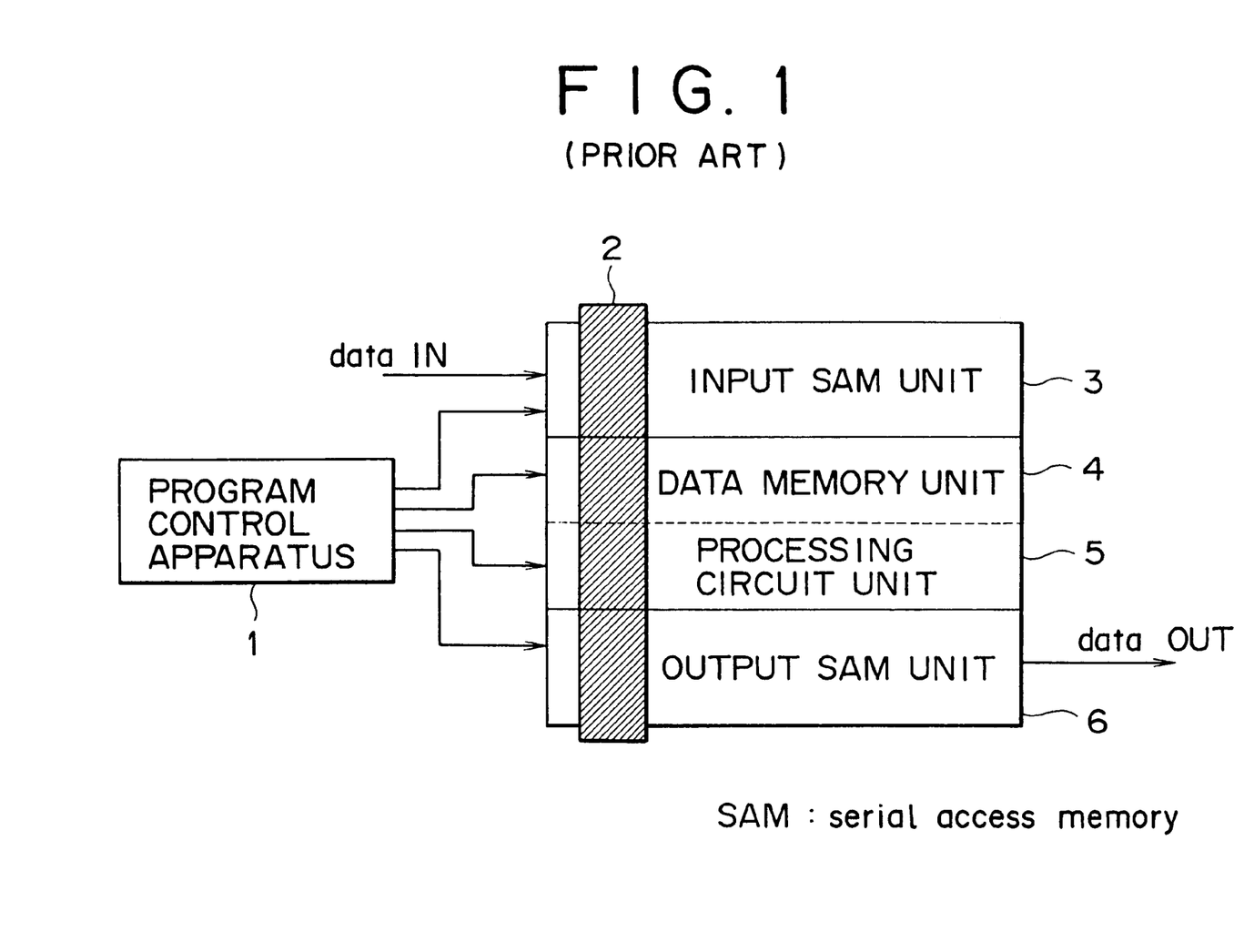
FIG. 1 is a block diagram showing a typical configuration of the conventional data processing apparatus.

FIG. 1 is a block diagram showing a typical configuration of a conventional SIMD control parallel processor. As shown in the figure, the SIMD control parallel processor comprises a program control apparatus 1, an input SAM (Serial Access Memory) unit 3, a data memory unit 4, a processing circuit unit 5 and an output SAM unit 6.

The input SAM unit 3, the data memory unit 4, the processing circuit unit 5 and the output SAM unit 6 constitute a group of parallel element processors 2 arranged in a linear array. The element processors 2 are interlocked with each other under control in accordance with a program of the program control apparatus 1. The program control apparatus 1 comprises a program memory for storing the program in advance and a sequence control circuit for carrying on the program. The program control apparatus 1 generates a variety of control signals in accordance with the program in order to control a variety of circuits.

It should be noted that the input SAM (Serial Access Memory) unit 3, the data memory unit 4, and the output SAM unit 6 are each implemented as a memory, detailed explanation of which is omitted. In an apparatus shown in FIG. 3, row address decoders for these memories are included in the program control apparatus 1.

One element processor 2 is represented by a hatched block in FIG. 1. A plurality of element processors 2 are arranged in parallel, that is, in the horizontal direction of the figure. That is to say, the element processor 2 indicated by the hatch block comprises components of 1 processor.

Next, the operation of the linear array parallel processor for carrying out video processing shown in FIG. 1 is explained.

Input data, strictly speaking, picture data of 1 pixel, is supplied to the input SAM unit 3 in accordance with a control signal output by the program control apparatus 1. The element processors 2 from the leftmost one to the rightmost one shown in the figure sequentially process the data. That is to say, pieces of input data are supplied sequentially to input SAM cells of the input SAM unit 3 from the leftmost one to the rightmost one shown in the figure.

Since the number of element processors 2 is at least equal to the pixel count H in one horizontal scanning period of a video signal, pixel data of one horizontal scanning period of a video signal can be accumulated in the input SAM unit 3. The operation to supply input data is repeated for each horizontal scanning period.

Each time data of 1 horizontal scanning period of a picture signal is accumulated in the input SAM unit 3 as described above, the program control apparatus 1 carries out processing by executing SIMD control on the input SAM unit 3, the data memory unit 4, the processing circuit unit 5 and the output SAM unit 6 in accordance with the program as described below. In addition, the SIMD control causes the following operations to be executed in all the element processors 2 concurrently in the same way.

The input data of 1 horizontal scanning period of a picture signal accumulated in the input SAM unit 3 is, if necessary, transferred from the input SAM unit 3 to the data memory unit 4 during the next horizontal scanning period to be used in the subsequent processing.

In a transfer of data from the input SAM unit 3 to the data memory unit 4, the program control apparatus 1 makes an access to data of a predetermined bit count in the input SAM unit 3 selected by an input SAM read signal, and then outputs a memory access signal to write the data into a predetermined memory cell of the data memory unit 4.

Next, the program control apparatus 1 supplies data stored in the data memory unit 4 of each element processor 2 to the processing circuit unit 5 of the element processor 2 in accordance with the program and lets the processing circuit unit 5 carry out arithmetic and logic processing on the data supplied thereto. Results of processing are then written at a predetermined address of the data memory unit 4.

Figure 2:
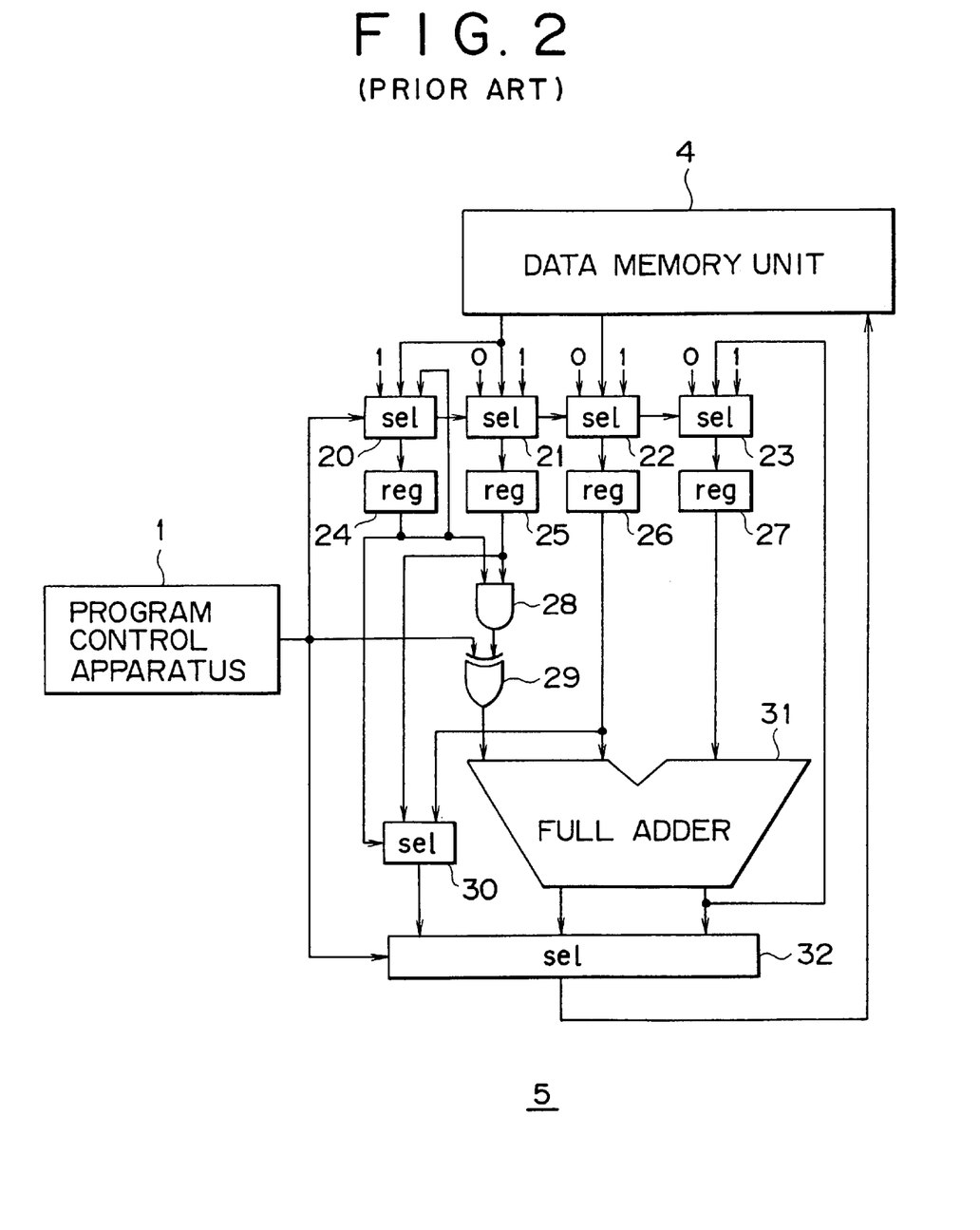
FIG. 2 is a block diagram showing a typical configuration of a processing circuit unit 5 employed in the conventional data processing apparatus shown in FIG. 1.

FIG. 2 is a block diagram showing a typical configuration of the processing circuit unit 5. Pieces of data from the data memory unit 4 are supplied to a register 24 by way of a selector 20, a register 25 by way of a selector 21 and a register 26 by way of a selector 22. The selector 20 selects the value 1 set in advance, the piece of data output by the data memory unit 4 or data stored in the register 24 and outputs the selected one to the register 24. A selector 21 selects the value 1 set in advance, the value 0 also set in advance or the piece of data output by the data memory unit 4 and outputs the selected one to a register 25. By the same token, a selector 22 selects the value 1 set in advance, the value 0 also set in advance or the piece of data output by the data memory unit 4 and outputs the selected one to a register 26. Signals generated by the program control apparatus 1 control how the selectors 20, 21 and 22 select one of their 3 inputs. A register 27 is used for storing data representing a carry-over generated by a full adder 31.

A logical product circuit 28 computes a logical product of the data stored in the register 24 and data stored in the register 25. An exclusive logical sum circuit 29 computes an exclusive logical sum of data output by the logical product circuit 28 and data supplied by the program control apparatus 1 and supplies the exclusive logical sum to the full adder 31. The full adder 31 also receives data stored in the register 26 and data stored in the register 27. The full adder 31 computes the sum of these 3 inputs, outputting the sum and its carry-over to a selector 32. The carry-over is also supplied to the register 27 by way of the selector 23.

A selector 30 selects either the data output by the register 25 or data output by the register 26 and outputs the selected one to the selector 32. The selector 32 selects 1 of 3 inputs: the data output by the selector 30, the sum output by the full adder 31 and the carry-over also output by the full adder 31 and outputs the selected one to the data memory unit 4. Signals generated by the program control apparatus 1 control how the selectors 30 and 32 select one of their inputs.

Assume that, for example, a signal generated by the program control apparatus 1 controls the selector 20 to let the selector 20 select the value 1 to be stored in the register 24. In this case, since the logic value 1 is stored in the register 24, data stored in the register 25 from the data memory unit 4 passes through the logical product circuit 28 as it is, entering the full adder 31 by way of the exclusive sum circuit 29. The full adder 31 computes the sum of the data supplied from the register 25 by way of the exclusive logical circuit 29, data stored in the register 26 from the data memory unit 4 and data representing a carry-over generated in previous processing and stored in the register 27. The sum and a newly generated carry-over are output to the selector 32. As described above, the carry-over is also supplied to the selector 27 by way of the selector 23 to be stored therein.

The program control apparatus 1 is also capable of controlling the selector 32 to select the carry-over generated by the full adder 31 to be output to the data memory unit 4. In addition, the program control apparatus 1 is also capable of controlling the selector 30 to select either the data output by the register 25 or data output by the register 26 to be output to data memory unit 4 by way of the selector 32 which is also controlled thereby to select the data selected by the selector 30.

When it is desired to supply data output by the logical product circuit 28 to the full adder 31 by logically inverting the data, the program control apparatus 1 outputs the logic value 1 to the exclusive sum circuit 29 as one of the inputs thereof. With the logic value 1 supplied to the exclusive sum circuit 29 as one of the inputs thereof, the exclusive sum circuit 29 will pass on a logic value 1 received from the logical product circuit 28 as a logic value 0 and pass on a logic value 0 received from the logical product circuit 28 as a logic value 1.

When it is desired to compute a logical product of newly input data and immediately previous data, the program control apparatus 1 controls the selector 20 to again select data stored in the register 24. With the selector 20 again selecting the data stored in the register 24, the logical product circuit 28 receives the current data and the immediately previous data and computes their logical product because the current data is stored in the register 25. By controlling the selector 20 to select the output of the register 24 repeatedly, processing can be carried out on new input data and previous input data.

When processing allocated to a 1 horizontal scanning period as described above is finished, data processed in the 1 horizontal scanning period is transferred to the output SAM unit 6 by the end of the 1 horizontal scanning period.

As described above, transfers of input data stored in the input SAM unit 3 to the data memory unit 4, processing of the data carried out by the processing circuit unit 5 and transfers of processing results to the output SAM unit 6 during the 1 horizontal scanning period are executed in accordance with the SIMD control program in bit units. These pieces of processing are carried out repeatedly in horizontal scanning period units.

The data transferred to the output SAM unit 6 is further output from the output SAM unit 6 in the next horizontal scanning period.

As described above, 3 pieces of processing are carried out on each piece of input data. The 3 pieces of processing are the input processing to write input data into the input SAM unit 3, the arithmetic/logic processing controlled by the program control apparatus 1 and the output processing to output results of processing from the output SAM unit 6. The arithmetic/logic processing controlled by the program control apparatus 1 comprises transfers of input data stored in the input SAM unit 3 to the data memory unit 4, processing of the data carried out by the processing circuit unit 5 and transfers of processing results to the output SAM unit 6. It should be noted that the 3 pieces of processing are executed as pipeline processing with 1 horizontal scanning period of the picture signal taken as a unit.

Pay attention to data input in 1 horizontal scanning period. Typically, it takes as much time as about 1 horizontal scanning period to complete each of the 3 pieces of processing. Thus, in order to complete the 3 pieces of processing for the data, it takes as much time as about 3 horizontal scanning periods. Since the 3 pieces of processing are pipeline processing which is carried out concurrently, that is, processing wherein the second piece of processing for data of a horizontal scanning period is carried out concurrently with the first piece of processing for data of the following horizontal scanning period, however, it takes as much time as only about 1 horizontal scanning period to complete the 3 pieces of processing for data of 1 horizontal scanning period on the average.

With the conventional signal processing apparatus described above, however, timing to read out data from the input SAM unit may be different from timing to write results of processing into the output SAM unit in processing such as conversion of the number of lines. Of course, this timing discrepancy problem can be solved, for example, by providing a frame memory at a stage prior to the signal processing apparatus. However, such a frame memory will raise another problem of a rising cost.

In order to solve the timing discrepancy problem described above, it is necessary to suspend the processing when a request to read out data from the input SAM unit and a request to write results of processing into the output SAM unit are issued.

SUMMARY OF THE INVENTION

It is thus an object of the present invention addressing the problems described above to provide a data processing apparatus which can be made at a low cost and is capable of temporarily storing data read out from the input SAM unit into a memory in case processing of data of a previous line has not been completed yet and capable of reading out pieces of data from the memory sequentially for processing on a FIFO basis, that is, in an order the pieces of data were written into the memory.

A data processing apparatus provided by the invention comprises:

an address modifying means for modifying an address specified by a program in an access to a data storage unit; and an information generating means for generating control information for controlling modification of an address carried out by said address modifying means in accordance with an instruction issued by said program.

A data processing method adopted in said data processing apparatus comprises:

an address modifying step of modifying an address specified by said program in an access to said data storage unit; and an information generating step of generating control information for controlling modification of an address carried out at said address modifying step in accordance with an instruction issued by said program.

In said data processing apparatus, said address modifying means modifies an address specified by said program in an access to said data storage unit; and said information generating means generates control information for controlling modification of an address carried out by said address modifying means in accordance with an instruction issued by said program.

According to said data processing method adopted in said data processing apparatus, at said address modifying step, an address specified by said program in an access to said data storage unit is modified; and at said information generating step, control information for controlling modification of an address carried out at said address modifying step is generated in accordance with an instruction issued by said program.

Preferred embodiments of the present invention will be described below. In order to clarify relations associating means described in claims of the present specification with elements employed in the embodiments, characteristics of the present invention are explained below by adding a typical element of an embodiment enclosed in parentheses after a means in a claim which corresponds to the element in the form "a means (implemented for example by a typical element)". It is needless to say, however, that the description is not intended to be construed in a limiting sense. That is to say, the implementation of the means is not limited to the typical element corresponding to the means.

Figure 3:
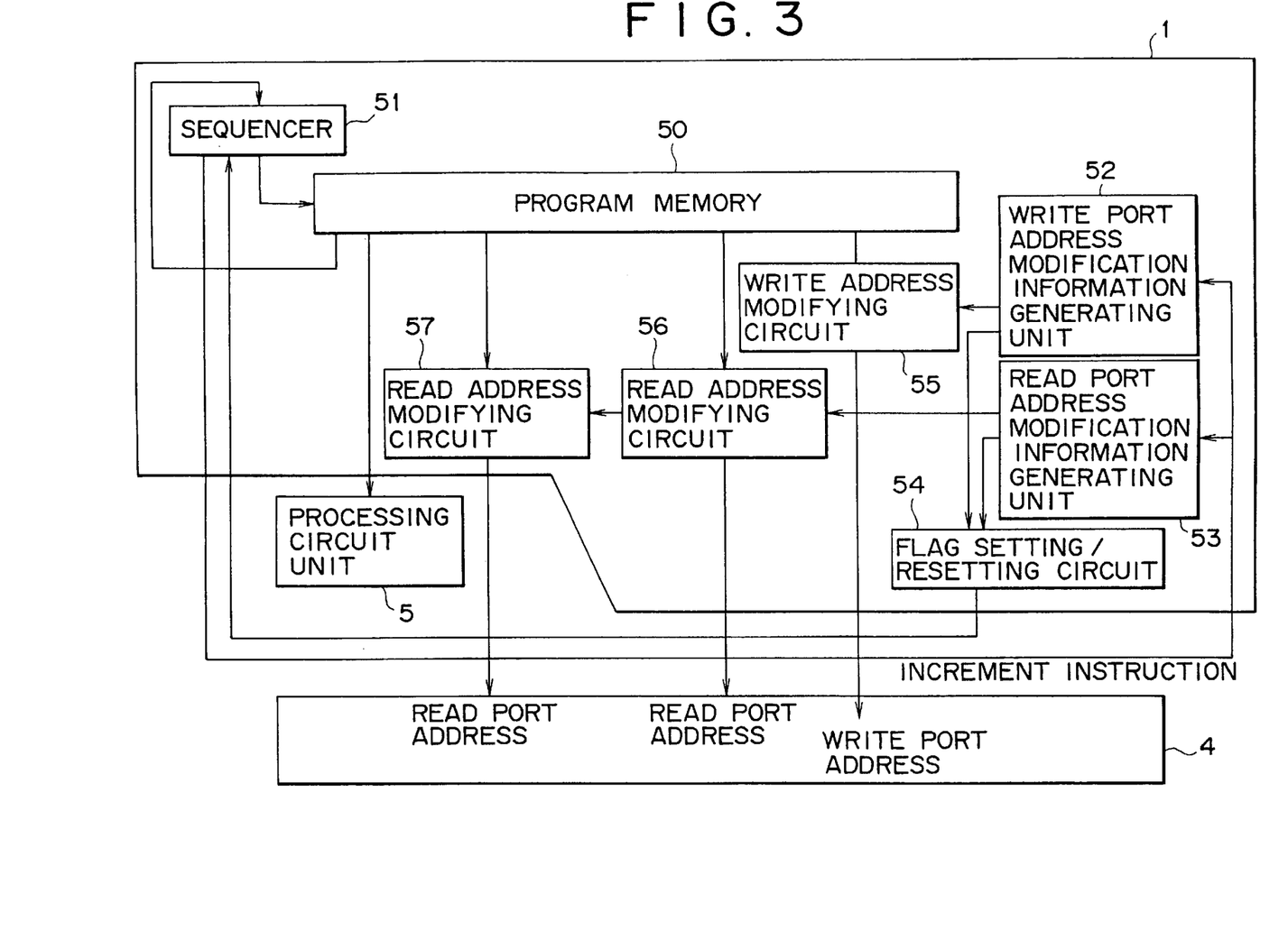
FIG. 3 is a block diagram showing a typical configuration of a data processing apparatus provided by the present invention.

A data processing apparatus provided by the present invention comprises:

a data storage unit (implemented for example by a data memory unit 4 shown in FIG. 1) for storing input data;

a data processing unit (implemented for example a processing circuit unit 5 shown in FIG. 1) for processing data stored in said data storage unit;

a control unit (implemented for example by a program control apparatus 1 shown in FIG. 1) for controlling operations of said data storage unit and said data processing unit in accordance with a program;

an address modifying means (implemented for example by a memory write address modifying circuit 55 employed in said program control apparatus 1 shown in FIG. 3) for modifying an address specified by said program in an access to said data storage unit; and an information generating means (implemented for example by a write port address modification information generating unit 52 employed in said program control apparatus 1 shown in FIG. 3) for generating control information for controlling modification of an address carried out by said address modifying means in accordance with an instruction issued by said program.

Said information generating means of said data processing apparatus is further provided with a flag setting/resetting means (implemented for example by a flag setting/resetting means 54 employed in said program control apparatus 1 shown in FIG. 3) for setting/resetting a flag on the basis of an addition value held in a second information holding means, the number of times an operation to modify a memory address has been carried out held in a fourth information holding means and the maximum number of times an operation to modify a memory address can be carried out held in a fifth information holding means and said program controls said information generating means in accordance with said flag.

As described above, according to the data processing apparatus claimed as claim 1, a memory address issued by a program is modified in accordance with control information generated in dependence on an instruction from the program specifying the memory address, making it possible to prevent the description of the program from becoming complicated.

BRIEF DESCRIPTION OF THE DRAWINGS

Preferred embodiments of the present invention will be described by referring to the following diagrams wherein.

DETAILED DESCRIPTION OF THE PREFERRED EMBODIMENT

The present invention will become more apparent from a careful study of the following detailed description of a preferred embodiment with reference to the accompanying diagrams. FIG. 3 is a block diagram showing a typical configuration of a data processing apparatus provided by the present invention. As shown in the figure, a program control apparatus 1 comprises a program memory 50 for storing a program, a sequencer 51 operating in accordance with the program, memory address modifying circuits 55 to 57 for modifying a memory address used in making an access to a data memory unit 4, a write port address modification information generating unit 52 and a read port address modification information generating unit 53. The write port address modification information generating unit 52 and the read port address modification information generating unit 53 generate information for controlling modification of memory addresses in the memory address modifying circuits 55 to 57.

A sequence control field, a processing circuit control field and a memory address control field of the program memory 50 are assigned to control functions for controlling all functions of the data processing apparatus.

The sequencer 51 performs operations such as incrementing a memory address, jumping to a specified memory address and calling a subroutine through the use of a stack in accordance with code stored in the sequence control field.

The processing circuit control field is used for storing control code allowing an element processor 2 to carry out desired operations such as addition, subtraction and logic processing.

The memory address control field generates memory addresses for 2 read ports and 1 write port of the data memory unit 4 employed in the data processing apparatus shown in FIG. 1.

The program memory 50 is connected to the memory address modifying circuits 55 to 57, a processing circuit unit 5 and the sequencer 51. The sequencer 51 is connected to the write port address modification information generating unit 52, the read port address modification information generating unit 53 and the program memory 50. The write port address modification information generating unit 52 is connected to the memory write address modifying circuit 55 which is connected to the data memory unit 4. The read port address modification information generating unit 53 is connected to the memory read address modifying circuits 56 and 57 which are connected to the data memory unit 4. The write port address modification information generating unit 52 and the read port address modification information generating unit 53 are connected also to a flag setting/resetting circuit 54 which is connected to the sequencer 51.

Figure 4:
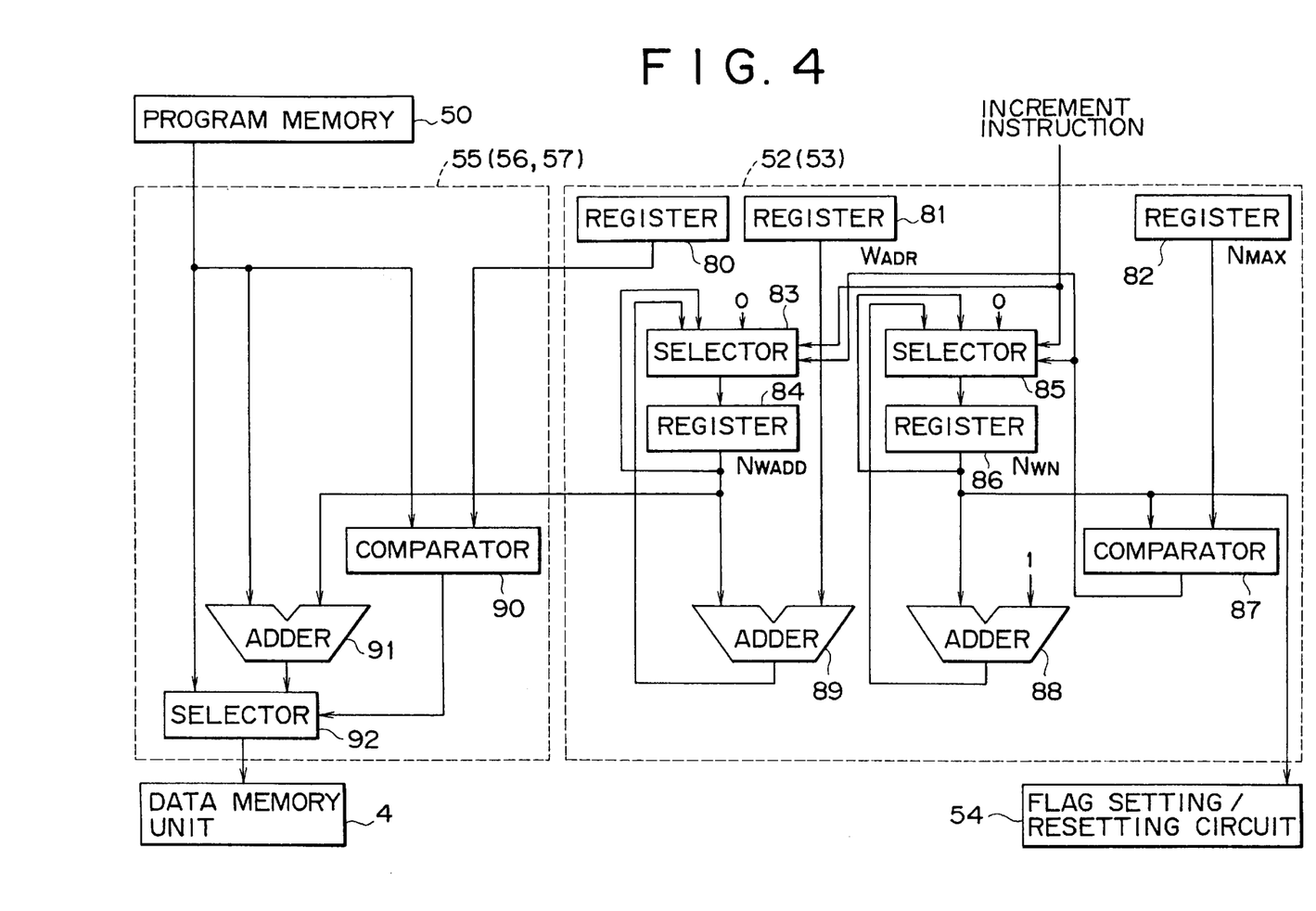
FIG. 4 is a block diagram showing typical configurations of a write port address modification information generating unit 52 and a memory write address modifying circuit 55 employed in the data processing apparatus shown in FIG. 3.

FIG. 4 is a block diagram showing typical configurations of the write port address modification information generating unit 52 and the memory write address modifying circuit 55 shown in FIG. 3. A memory write address from the program memory 50 is supplied to a comparator 90, an adder 91 and a selector 92. The comparator 90 compares the memory write address with upper and lower limits of a specific area stored in a register 80. A result of the comparison is used for controlling the selector 92. The adder 91 adds the memory write address to an addition value stored in a register 84 and supplies the sum to the selector 92 along with the memory write address from the program memory 50. The selector 92 selects either the sum or the memory write address and supplies the selected one to the data memory unit 4.

A register 81 for storing the address range (the width) of the specific area referred to as $W_{ADR}$ is connected to an adder 89. A result of addition in the adder 89 is supplied to a selector 83. Also supplied to the selector 83 besides the result of addition are a value of 0 and the contents of the register 84 for storing a previous result of addition. The selector 83 selects one among the 3 inputs and outputs the selected one to the register 84.

A value of 1 is supplied to an adder 88. A result of addition in the adder 88 is supplied to a selector 85. Also supplied to the selector 85 besides the result of addition are a value of 0 and the contents of a register 86 for storing a previous result of addition. The selector 85 selects one among the 3 inputs and outputs the selected one to the register 86. A register 82 for storing a maximum number of times ($N_{MAX}$) addition, that is modification of a memory write address, can be carried out is connected to a comparator 87. A result of comparison in the comparator 87 is used for controlling the selectors 85 and 83.

Figure 5:
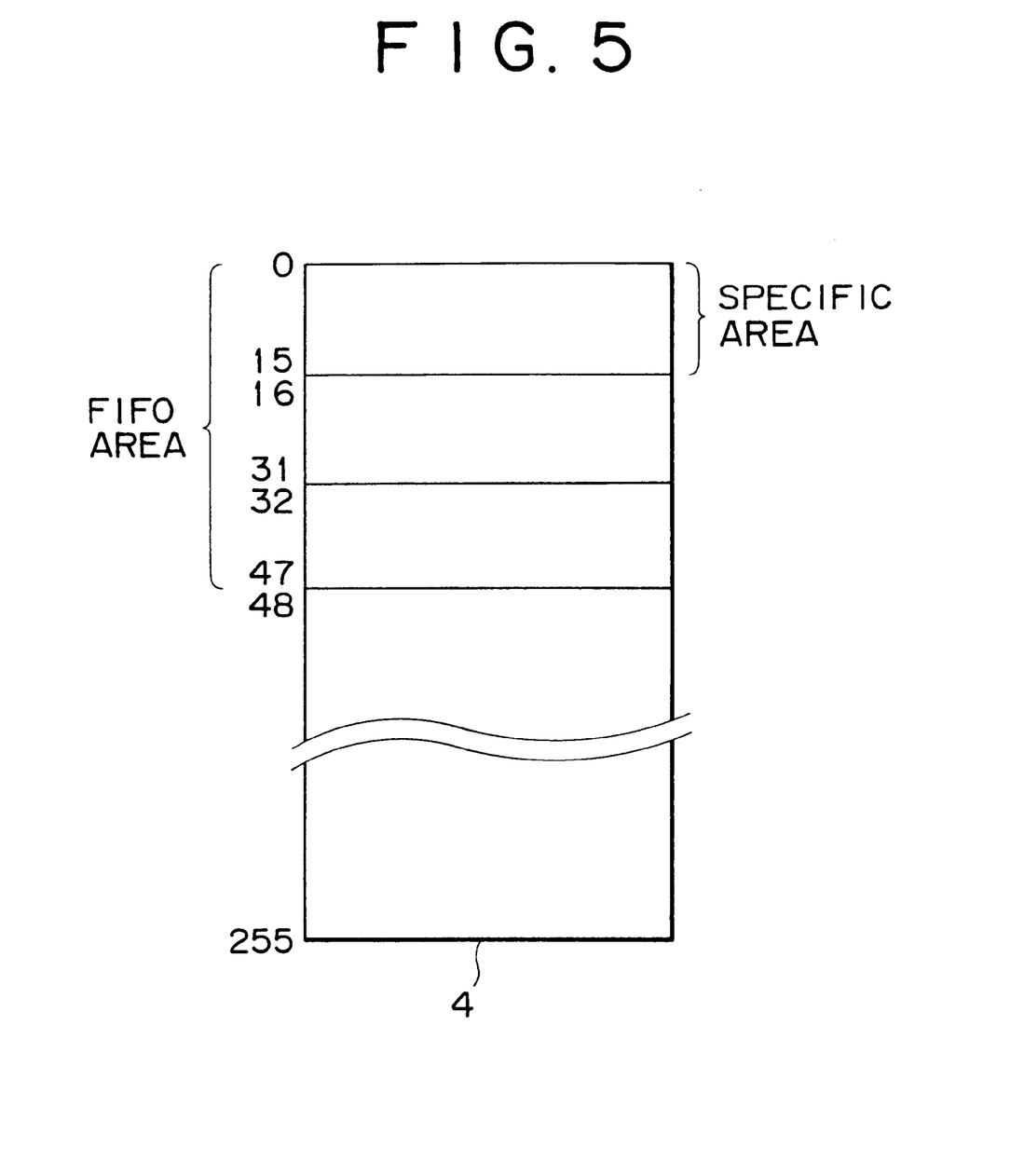
FIG. 5 is an explanatory diagram used for describing areas in use of a data memory unit 4 employed in the data processing apparatus shown in FIG. 3.

The following description explains how the data memory unit 4 is used by referring to FIG. 5, an explanatory diagram used for describing areas in use of the data memory unit 4 employed in the data processing apparatus. As shown in FIG. 5, the data memory unit 4 of each of the element processors 2 has a storage area from address 0 to address 255. An area from address 0 to address 15 is referred to as a specific area. An area from address 0 to address 47 is used as a FIFO area. Thus, the FIFO area includes the specific area and has a range equal to 3 times the specific area. In the case of the memory allocation shown in FIG. 5, the registers 80 of the write port address modification information generating unit 52 and the read port address modification information generating unit 53 each contain addresses 15 and 0, the upper and lower limits of the specific area. On the other hand, the registers 81 of the write port address modification information generating unit 52 and the read port address modification information generating unit 53 each contain a value of 16, the range (the width) of the specific area referred to as $W_{ADR}$. Since the range of the FIFO area is 3 times the range of the specific area, the registers 82 of the write port address modification information generating unit 52 and the read port address modification information generating unit 53 each contain a value of 3, the maximum number of times ($N_{MAX}$) an operation to modify a memory address can be carried out, that is, an operation to write data into the FIFO area or read out data from the FIFO area can be carried out, before an overflow or an underflow occurs in the FIFO area.

Figures 6, 6B:
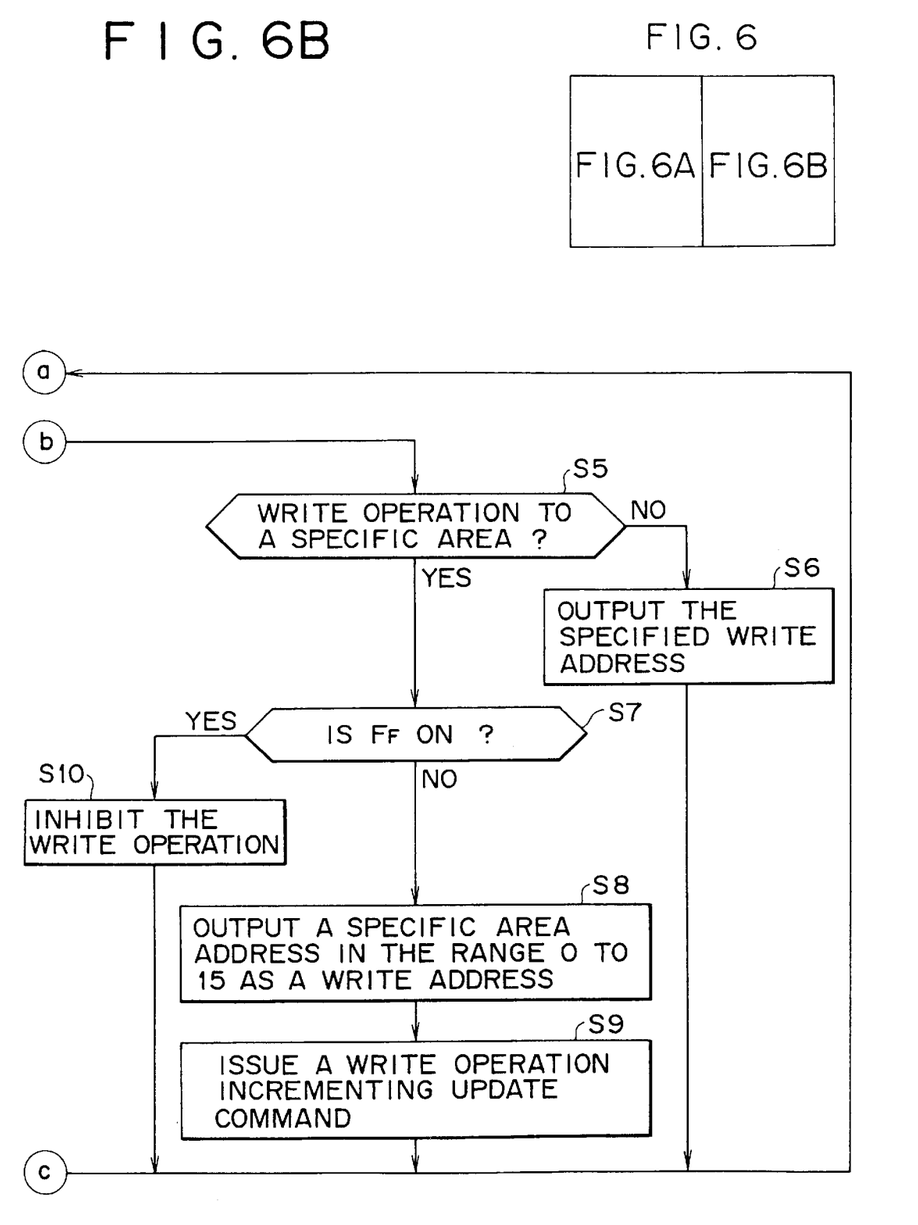
FIG. 6 is a flowchart used for explaining processing carried out by a sequencer 51 employed in the data processing apparatus shown in FIG. 3.
Figure 6A:
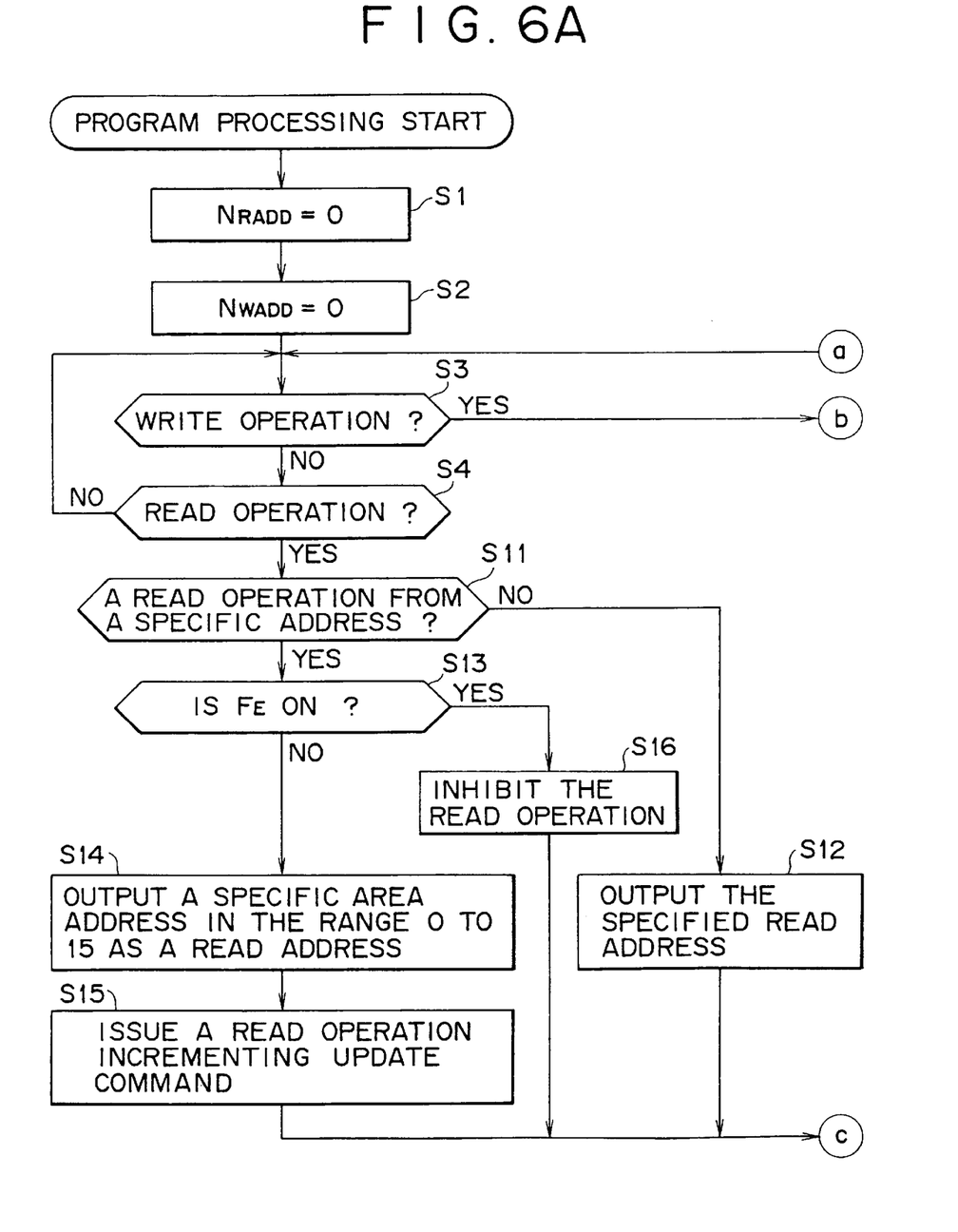

The following description explains how the sequencer 51 carries out processing represented by the flowchart shown in FIG. 6 in accordance with a program stored in the program memory 50. As shown in the figure, the flowchart begins with a step S1 at which an addition value $N_{RADD}$ stored in the register 84 of the read port address modification information generating unit 53 is initialized to 0. The addition value $N_{RADD}$ is a value to be added to a memory read address. The flow of processing then goes on to a step S2 at which an addition value $N_{WADD}$ stored in the register 84 of the write port address modification information generating unit 52 is initialized to 0. The addition value $N_{WADD}$ is a value to be added to a memory write address.

Then, the flow of processing proceeds to steps S3 and S4 to form judgments as to whether or not the access to the data memory unit 4 is a write operation and a read operation respectively. If the outcome of the judgment formed at the step S3 indicates that the access is a write operation, the flow of processing continues to a step S5 to form a judgment as to whether or not the access is an operation to write data into the specific area of the data memory unit 4. When new data is transferred from the input SAM unit 3 to the processing circuit unit 5 with timing coinciding with the end of processing carried out by the processing circuit unit 5, for example, it is not necessary to temporarily store the new data in the FIFO area. In this case, the outcome of the judgment formed at the step S5 is NO, leading the flow of processing to a step S6 at which the program memory 50 supplies a specified memory write address to the comparator 90. Since data will not be stored at an address in the FIFO area ranging from address 0 to address 48 in this case, the specified memory write address is in the range 49 to 255. The comparator 90 compares the specified memory write address with the upper and lower limits stored in the register 80. Since the address is beyond the range defined by the upper and lower limits stored in the register 80, the comparator 90 controls the selector 92 to select the memory write address supplied by the program memory 50 and forward the address to the data memory unit 4 as it is. As a result, data is written into the data memory address 4 at the memory write address specified by the program memory 50.

When new data is transferred from the input SAM unit 3 to the processing circuit unit 5 with timing prior to the end of processing carried out by the processing circuit unit 5, on the other hand, it is necessary to store the data memory unit 4, strictly speaking, to temporarily store the data in the FIFO area of the data memory unit 4. In this case, the outcome of the judgment formed at the step S5 is YES indicating that it is necessary to store the data in the FIFO area, leading the flow of processing to a step S7 to form a judgment as to whether a full area flag $F_F$ is on or off. The full area flag $F_F$ is turned on when the FIFO area is full and turned off when there is a free space in the FIFO area. Details of this full area flag processing will be described later by referring to a flowchart shown in FIG. 7.

If the full area flag $F_F$ is off, the flow of processing continues to a step S8 at which the sequencer 51 outputs an address in the specific area to the program memory 50, that is, an address the range 0 to 15 shown in FIG. 5, as a memory write address. The memory write address is supplied by the program memory 50 to the comparator 90 which compares the address with the upper and lower limits stored in the register 80. Since the address is in the range defined by the upper and lower limits stored in the register 80, the comparator 90 controls the selector 92 to select an address output by the adder 91.

The adder 91 adds the memory write address output by the program memory 50 to the addition value $N_{WADD}$ stored in the register 84. At the present time, however, the addition value $N_{WADD}$ is 0. Thus, the output of the adder 91 is the memory write address supplied by the program memory 50. As a result, the address output by the program memory 50 is in essence selected by the selector 92 as it is and supplied to the data memory unit 4. For example, if the memory write address is 0, the new data is written at address 0.

The flow of processing then continues to a step S9 at which the sequencer 51 issues a command to the write port address modification information generating unit 52 to carry out a write operation incrementing update operation. In accordance with this command, the addition value $N_{WADD}$ stored in the register 84 and the number of FIFO write operations carried out so far ($N_{WN}$) stored in the register 86 employed in the write port address modification information generating unit 52 are updated as described later. Details of this write operation incrementing update operation will be described later by referring to a flowchart shown in FIG. 8.

Figure 7:
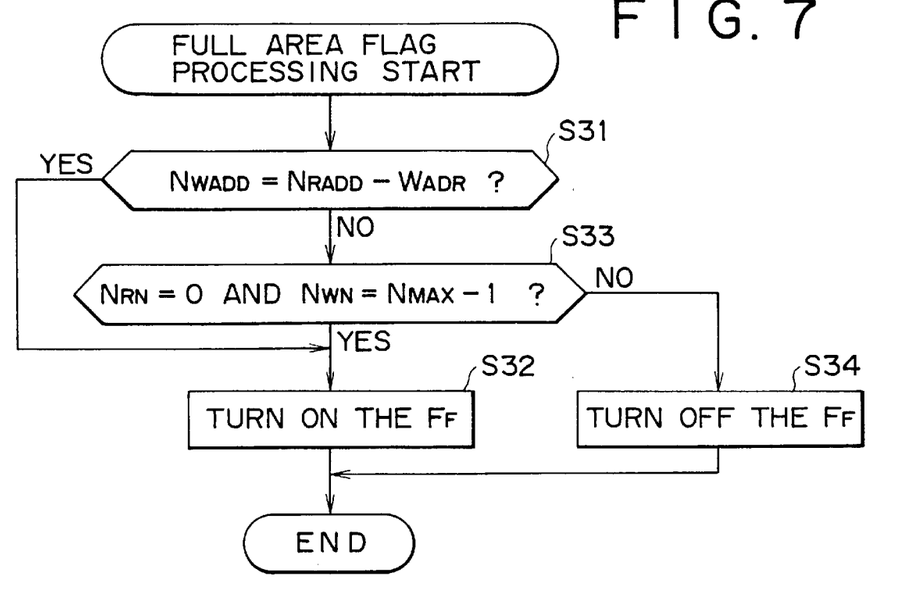
FIG. 7 is a flowchart used for explaining full area flag setting/resetting processing carried out by a flag setting/resetting circuit 54 employed in the data processing apparatus shown in FIG. 3.

Next, the full area flag processing is explained by referring to the flowchart shown in FIG. 7. The processing is carried out by the flag setting/resetting circuit 54 shown in FIG. 3 by examining the outputs $N_{WADD}$ and $N_{WN}$ of the write port address modification information generating unit 52 and outputs $N_{RADD}$ and $N_{RN}$ of the read port address modification information generating unit 53 to be described later.

As shown in FIG. 7, the flowchart begins with a step S31 to form a judgment as to whether or not the addition value $N_{WADD}$ of a write operation stored in the register 84 employed in the write port address modification information generating unit 52 is equal to a result of subtraction of the width $W_{ADR}$ of the specific area from the addition value $N_{RADD}$ of a read operation stored in the register 84 employed in the read port address modification information generating unit 53. At the present time, since the addition values $N_{WADD}$ and $N_{RADD}$ are both a zero, the addition value $N_{WADD}$ is not equal to the result of the subtraction. In this case, the flow of processing goes on to a step S33 to form a judgment as to whether or not the number of FIFO read operations carried out so far ($N_{RN}$) stored in the register 86 employed in the read port address modification information generating unit 53 is equal to zero and the number of FIFO write operations carried out so far ($N_{WN}$) stored in the register 86 employed in the write port address modification information generating unit 52 is equal to $N_{MAX}-1$ where $N_{MAX}$ is the maximum number of allowed FIFO write operations stored in the register 82. At the present time, $N_{RN}$ is zero but $N_{WN}$ is also zero and is thus not equal to $N_{MAX}-1$. In this case, the flow of processing proceeds to a step S34 at which the full area flag $F_F$ is turned off.

If the outcome of the judgment formed at the step S31 indicates that the addition value $N_{WADD}$ is equal to a result of subtraction of the width $W_{ADR}$ from the addition value $N_{RADD}$ or the outcome of the judgment formed at the step S33 indicates that the number of FIFO read operations carried out so far ($N_{RN}$) is equal to zero and the number of FIFO write operations carried out so far ($N_{WN}$) is equal to $N_{MAX}-1$, on the other hand, the flow of processing continues to a step S32 at which the full area flag $F_F$ is turned on.

Figure 8:
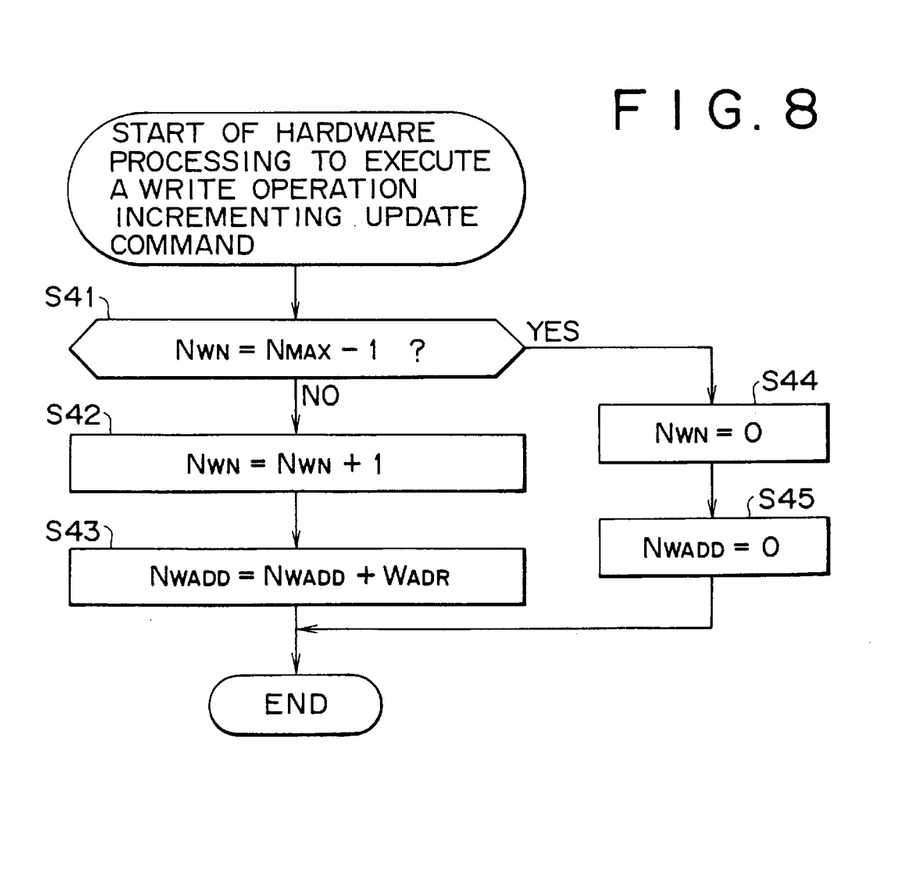
FIG. 8 is a flowchart used for explaining processing carried out by the write port address modification information generating unit 52 shown in FIG. 4 in execution of a write operation incrementing update command.

Next, processing of a write operation incrementing update command is explained by referring to the flowchart shown in FIG. 8. The processing is carried out by the write port address modification information generating unit 52 when the sequencer 51 issues the write operation incrementing update command at the step S9 of the flowchart shown in FIG. 6.

As shown in the figure, the flowchart begins with a step S41 at which the comparator 87 compares the number of FIFO write operations carried out so far ($N_{WN}$) stored in the register 86 employed in the write port address modification information generating unit 52 with $N_{MAX}-1$ where $N_{MAX}$ is the maximum number of allowed FIFO write operations stored in the register 82 to form a judgment as to whether or not the former is equal to the latter. If the former is found unequal to the latter, the flow of processing goes on to a step S42 at which the comparator 87 controls the selector 85 to select the output of the adder 88. The output of the adder 88 is a result of addition of 1 to the number of FIFO write operations carried out so far ($N_{WN}$) stored in the register 86 which currently has a value of 0. Controlled by the comparator 87, the selector 85 selects the output of the adder 88 and supplies it back to the register 86. As a result, the number of FIFO write operations carried out so far ($N_{WN}$) is incremented by 1 to a value of 1 ($N_{WN}=1$).

The flow of processing then goes on to a step S43 at which the comparator 87 controls the selector 83 to select the output of the adder 89. The output of the adder 89 is a result of addition of the width $W_{ADR}$ of the specific area stored in the register 81 to the addition value $N_{WADD}$ of a write operation stored in the register 84 which currently has a value of 0. Controlled by the comparator 87, the selector 83 selects the output of the adder 89 and supplies it back to the register 84. As a result, the addition value $N_{WADD}$ in a write operation is incremented by $W_{ADR}$ which has a typical value of 16 ($N_{WADR}=16$).

A subsequent operation to write data into the FIFO area is carried out in the same way as what is described above. As the operation to write data into the FIFO area is carried out twice, the number of FIFO write operations carried out so far ($N_{WN}$) becomes 2 at the step S42 of the flowchart of the write operation incrementing update processing shown in FIG. 8 and the addition value $N_{WADD}$ in the write operation becomes 32 at the step S43. In this case, the outcome of the judgment formed at the step S33 of the flowchart of the full area flag processing shown in FIG. 7 indicates that $N_{RN}=0$ and $N_{WN}=2$ (=3-1=$N_{MAX}$-1). Thus, the flow of processing goes on to the step S32 at which the full area flag $F_F$ is turned on.

As a result, when a command to write data into the FIFO area is issued for the third time, the outcome of the judgment formed at the step S7 of the flowchart shown in FIG. 6 indicates that the full area flag $F_F$ is turned on, leading the flow of processing to the step S10 at which the operation to write data into the FIFO area is inhibited.

If the outcome of the judgment formed by the comparator 87 at the step S41 of the flowchart of the write operation incrementing update processing shown in FIG. 8 indicates that the number of FIFO write operations carried out so far ($N_{WN}$) stored in the register 86 employed in the write port address modification information generating unit 52 is equal to $N_{MAX}$-1 where $N_{MAX}$ is the maximum number of allowed FIFO write operations stored in the register 82, on the other hand, the flow of processing goes on to a step S44 at which the comparator 87 controls the selector 85 to select the value 0 and to pass on the value 0 to the register 86. As a result, the number of FIFO write operations carried out so far ($N_{WN}$) is set at 0 ($N_{WN}=0$). The flow of processing goes on to a step S45 at which the comparator 87 controls the selector 83 to select the value 0 and to pass on the value 0 to the register 84. As a result, the addition value $N_{WADD}$ is set at 0 ($N_{WADD}=0$). It should be noted that, when an operation to write data into the FIFO area is requested after an operation to read out data from the FIFO area has been carried out and the full area flag $F_F$ has been turned off, the pieces of processing of the steps S41, S44 and S45 are carried out in accordance with a write operation incrementing update command issued at the step S9 shown in FIG. 6.

Figure 9:
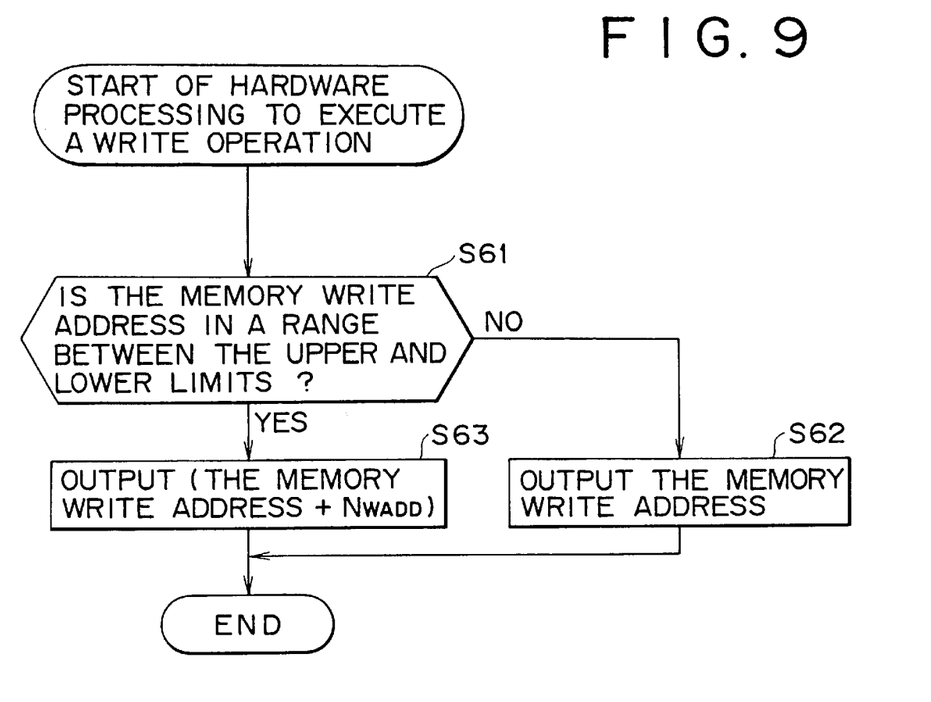
FIG. 9 is a flowchart used for explaining processing carried out by the memory write address modifying circuit 55 and the write port address modification information generating unit 52 shown in FIG. 4 in a write operation.

The pieces of processing carried out by the memory write address modifying circuit 55 and the write port address modification information generating unit 52 in a write operation described above can be summarized into a simpler flowchart shown in FIG. 9.

As shown in the figure, the flowchart begins with a step S61 to form a judgment as to whether a memory write address received from the program memory 50 is an address of a specific area, the upper and lower limits of which are stored in the register 80. If the memory write address is not an address of the specific area, the flow of processing goes on to a step to a step S62 at which the comparator 90 controls the selector 92 to select the memory address from the program memory 50 as it is. If the outcome of the judgment formed at the step S61 indicates that the memory write address from the program memory 50 is an address of the specific area, the upper and lower limits of which are stored in the register 80, on the other hand, the flow of processing proceeds to a step S63 at which the comparator 90 controls the selector 92 to select the output of the adder 91. As a result, the selector 92 passes on a result of adding an addition value $N_{WADD}$ stored in the register 84 to the memory write address from the program memory 50 to the data memory unit 4.

Next, a read operation represented as a part of the flowchart shown in FIG. 6 is explained. If the outcome of the judgment formed at the step S4 indicates that the access to the data memory unit 4 is an operation to read out data from it, the flow of processing goes on to a step S11 to form a judgment as to whether or not a memory read address received from the program memory 50 is an address in the specific area. To put it in detail, the comparator 90 of the memory read address modifying circuit 56 determines whether or not the memory read address from the program memory 50 is an address in the specific area, the upper and lower limits of which are stored in the register 80 employed in the read port address modification information generating unit 53. By the same token, the comparator 90 of the memory read address modifying circuit 57 also determines whether or not the memory read address from the program memory 50 is an address in the specific area, the upper and lower limits of which are stored in the register 80 employed in the read port address modification information generating unit 53. If the memory read address received from the program memory 50 is not an address in the specific area, the flow of processing proceeds to a step S12 at which the read operation is executed at the memory read address with the memory read address remaining unchanged as it is. That is to say, the comparator 90 controls the selector 92 to select the memory read address from the program memory 50 as it is and outputs the address to the data memory unit 4. Thus, in this read operation, data stored at one of addresses 49 to 255 in the data memory unit 4 is read out.

If the outcome of the judgment formed at the step S11 indicates that the memory read address from the program memory 50 is an address in the specific area, the upper and lower limits of which are stored in the register 80 employed in the read port address modification information generating unit 53, on the other hand, the flow of processing proceeds to a step S13 at which the sequencer 51 forms a judgment as to whether the empty area flag $F_E$ is turned on or off. The empty area flag processing will be described later by referring to a flowchart shown in FIG. 10. The empty area flag $F_E$ is turned on when there is no data at all stored in the FIFO area and turned off when some data is stored therein. If the flag $F_E$ is turned on to indicate that the FIFO area is empty or there is no stored data at all, the flow of processing continues to a step S16 at which processing to inhibit a read operation is carried out.

If the outcome of the judgment formed at the step S13 indicates that the flag $F_E$ is turned off to indicate that there is data stored in the FIFO area, on the other hand, the flow of processing continues to a step S14 at which the memory read address received from the program memory 50, an address in the range 0 to 15, is output the comparator 90 employed in the memory read address modifying circuit 56. The comparator 90 compares the memory read address with an upper and lower limits stored in the register 80 employed in the read port address modification information generating unit 53. Since the memory read address is an address in the specific area, the comparator 90 controls the selector 92 to select an address output by the adder 91. The adder 91 adds the address output by the program memory 50 to the addition value $N_{RADD}$ stored in the register 84. At the present time, however, the addition value $N_{RADD}$ is 0. Thus, the output of the adder 91 is the address supplied by the program memory 50. As a result, the address output by the program memory 50 is in essence selected by the selector 92 as it is and supplied to the data memory unit 4 to be used in the operation to read data from the specific area.

The flow of processing then goes on to a step S15 at which the sequencer 51 issues a read operation incrementing update comm and to the read port address modification information generating unit 53. In accordance with this command, the addition value $N_{RADD}$ stored in the register 84 and the number of FIFO read operations carried out so far ($N_{RN}$) stored in the register 86 employed in the read port address modification information generating unit 53 are updated as described later. Details of this read operation incrementing update operation will be described later by referring to a flowchart shown in FIG. 11.

Figure 10:
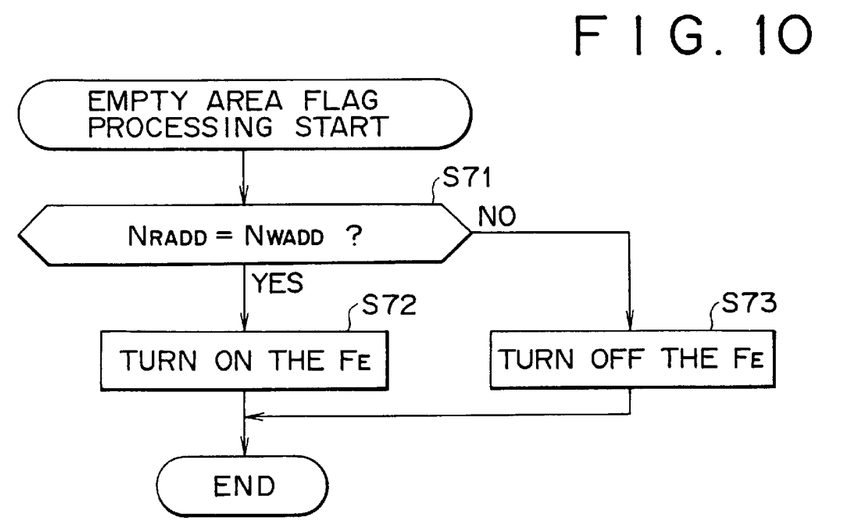
FIG. 10 is a flowchart used for explaining empty area flag setting/resetting processing carried out by the flag setting/resetting circuit 54 employed in the data processing apparatus shown in FIG. 3.

Next, the empty area flag processing is explained by referring to the flowchart shown in FIG. 10. The processing is carried out by the flag setting/resetting circuit 54 shown in FIG. 3 by monitoring the outputs $N_{WADD}$ and $N_{RADD}$ of the write port address modification information generating unit 52 and the read port address modification information generating unit 53 respectively.

As shown in FIG. 10, the flowchart begins with a step S71 to form a judgment as to whether or not the addition value $N_{WADD}$ of a write operation stored in the register 84 employed in the write port address modification information generating unit 52 is equal to the addition value $N_{RADD}$ of a read operation stored in the register 84 employed in the read port address modification information generating unit 53. If the addition value $N_{WADD}$ is found equal to the addition value $N_{RADD}$, the flow of processing goes on to a step S72 at which the empty area flag $F_E$ is turned on. If the addition value $N_{WADD}$ is found unequal to the addition value $N_{RADD}$, on the other hand, the flow of processing goes on to a step S73 at which the empty area flag $F_E$ is turned off. In the initial state, for example, both the addition values $N_{WADD}$ and $N_{RADD}$ are a zero. In this case, the empty area flag $F_E$ is turned on.

Figure 11:
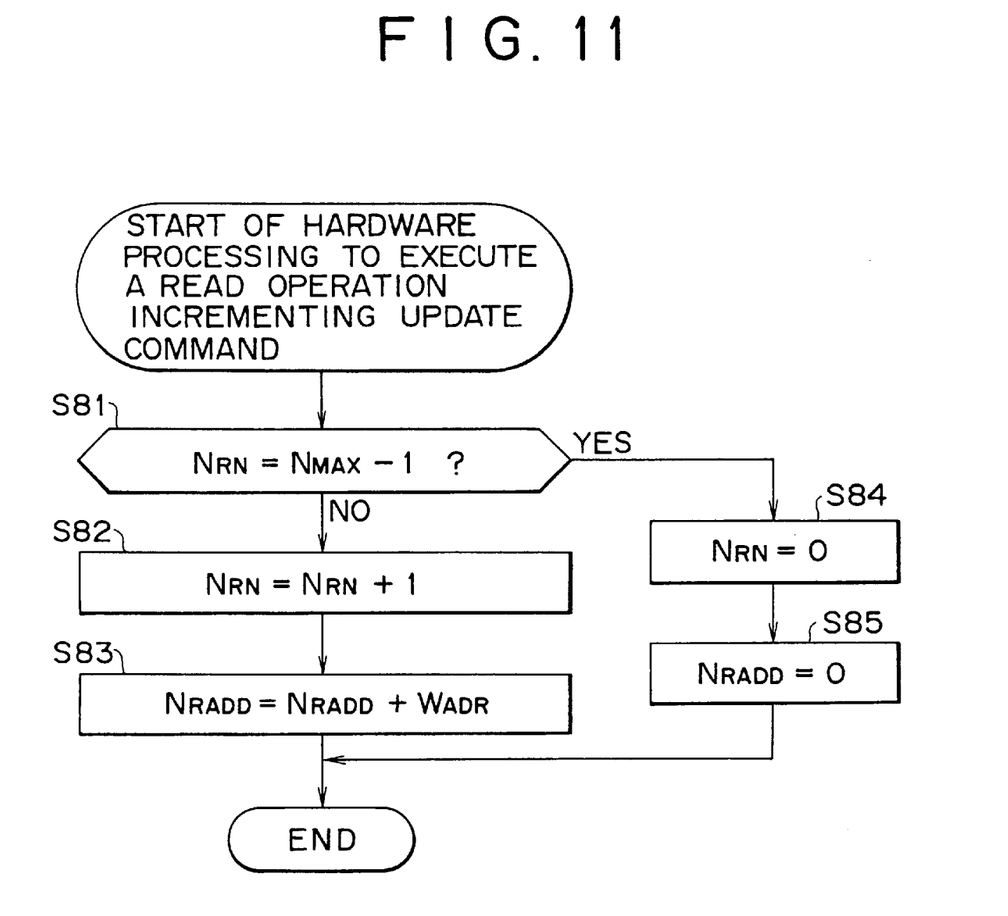
FIG. 11 is a flowchart used for explaining processing carried out by a memory read address modifying circuit 56 and a read port address modification information generating unit 53 employed in the data processing apparatus shown in FIG. 4 in execution of a read operation incrementing update command.

Next, processing of a read operation incrementing update command is explained by referring to the flowchart shown in FIG. 11. The processing is carried out by the read port address modification information generating unit 53 when the sequencer 51 issues the read operation incrementing update command at the step S15 of the flowchart shown in FIG. 6.

As shown in the figure, the flowchart begins with a step S81 at which the comparator S87 compares the number of FIFO read operations carried out so far ($N_{RN}$) stored in the register 86 employed in the read port address modification information generating unit 53 with $N_{MAX}-1$ where $N_{MAX}$ is the maximum number of allowed read operations stored in the register 82 to form a judgment as to whether or not the former is equal to the latter. If the former is found unequal to the latter, the flow of processing goes on to a step S82 at which the number of read operations carried so far ($N_{RN}$) is incremented by 1.

To put it in detail, at the step S82, the comparator 87 controls the selector 85 to select the output of the adder 88. The output of the adder 88 is a result of addition of 1 to the number of read operations carried so far ($N_{RN}$) stored in the register 86. Controlled by the comparator 87, the selector 85 selects the output of the adder 88 and supplies it back to the register 86. As a result, the number of read operations carried so far ($N_{RN}$) is incremented by 1.

The flow of processing then goes on to a step S83 at which the width $W_{ADR}$ of the specific area stored in the register 81 is added to the addition value $N_{RADD}$ of a read operation stored in the register 84 employed in the read port address modification information generating unit 53. To put it in detail, the comparator 87 controls the selector 83 to select the output of the adder 89. The output of the adder 89 is a result of addition of the width $W_{ADR}$ to the addition value $N_{RADD}$. Controlled by the comparator 87, the selector 83 selects the output of the adder 89 and supplies it back to the register 84. As a result, the addition value $N_{RADD}$ in a read operation is incremented by $W_{ADR}$.

When the operation to read out data from the FIFO area is carried out once, the number of read operations carried so far ($N_{RN}$) becomes 1 at the step S82 of the flowchart of the read operation incrementing update processing shown in FIG. 11 and the addition value $N_{RADD}$ in the read operation becomes equal to $W_{ADR}$ which has a value of 16 at the step S83. As the operation to read out data from the FIFO area is carried out twice, the number of read operations carried so far ($N_{RN}$) becomes 2 at the step S82 and the addition value $N_{RADD}$ in the read operation becomes equal to 32 at the step S83.

In an operation to read out data from the FIFO area carried out for the third time, the outcome of the judgment formed at the step S81 of the flowchart of the empty area flag processing shown in FIG. 11 indicates that $N_{RN}=2$ (=3−1= $N_{MAX}-1$). Thus, the flow of processing goes on to the step S84 at which the number of read operations carried so far ($N_{RN}$) is reset to 0. The flow then proceeds to a step S85 at which the addition value $N_{RADD}$ used in a read operation is also reset to 0 as well.

To put it in detail, if the number of read operations carried so far ($N_{RN}$) stored in the register 86 employed in the read port address modification information generating unit 53 is found equal to $N_{MAX}-1$ where $N_{MAX}$ is the maximum number of allowed read operations stored in the register 82, the comparator 87 controls the selectors 85 and 83 to each select a 0 and store it in the registers 86 and 84 respectively.

For example, when an operation to write data into the FIFO area is carried out 2 times to be followed by 2 operations to read out the data from the FIFO area, the addition value $N_{WADD}$ of a write operation stored in the register 84 employed in the write port address modification information generating unit 52 becomes equal to the addition value $N_{RADD}$ of a read operation stored in the register 84 employed in the read port address modification information generating unit 53. In this case, the outcome of the judgment formed at the step S71 of the flowchart of the empty area flag processing shown in FIG. 10 is YES, causing the processing to go on to the step S72 at which the empty area flag $F_E$ is turned on. In a next read operation, the outcome of the judgment formed at the step S13 of the flowchart shown in FIG. 6 indicates that the empty area flag $F_E$ is turned on, leading the flow of processing to the step S16 at which the operation to read out data from the FIFO area is inhibited.

Figure 12:
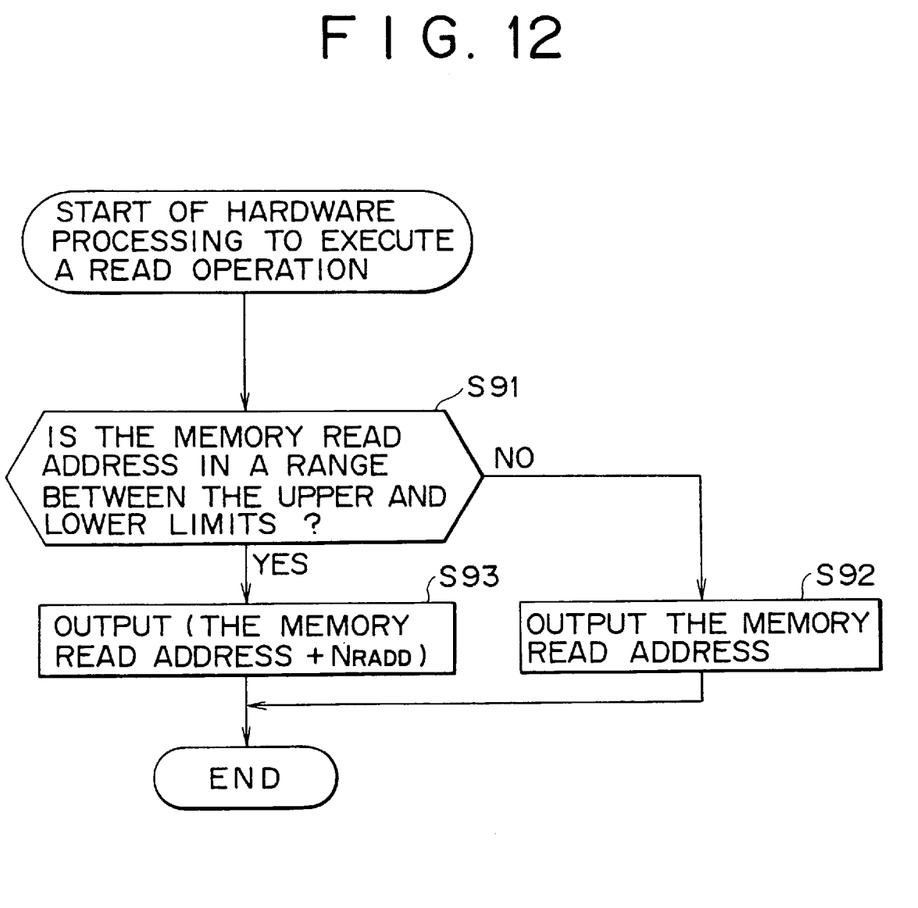
FIG. 12 is a flowchart used for explaining processing carried out by the memory read address modifying circuit 56 and the read port address modification information generating unit 53 shown in FIG. 4 in a read operation.

The pieces of processing carried out by the memory read address modifying circuit 56 and the read port address modification information generating unit 53 in a read operation described above can be summarized into a simpler flowchart shown in FIG. 12.

As shown in the figure, the flowchart begins with a step S91 to form a judgment as to whether a memory read address received from the program memory 50 is an address of a specific area, the upper and lower limits of which are stored in the register 80. If the memory read address is not an address of the specific area, the flow of processing goes on to a step S92 at which the comparator 90 controls the selector 92 to select the memory read address from the program memory 50 as it is. If the outcome of the judgment formed at the step S91 indicates that the memory address from the program memory 50 is an address of the specific area, the upper and lower limits of which are stored in the register 80, on the other hand, the flow of processing proceeds to a step S93 at which the comparator 90 controls the selector 92 to select the output of the adder 91. As a result, the selector 92 passes on a result of adding an addition value $N_{RADD}$ stored in the register 84 to the memory read address from the program memory 50 to the data memory unit 4.

It should be noted that, since the data memory unit 4 has 2 read ports, the program control apparatus 1 shown in FIG. 3 is provided with the memory read address modifying circuit 57 in addition to the memory read address modifying circuit 56. Since the operation of the memory read address modifying circuit 57 is the same as the memory read address modifying circuit 56, however, the explanation of the former is omitted.

As described above, since the program control apparatus 1 includes hardware such as the write port address modification information generating unit 52, the read port address modification information generating unit 53, the flag setting/resetting circuit 54, the memory write address modifying circuit 55 and the memory read address modifying circuits 56 and 57 in addition to the program memory 50 and the sequencer 51, it is possible to prevent time from being consumed and labor from being required in writing of the program stored in the program memory 50.

What is claimed is:

1. A data processing apparatus comprising:
   a data storage unit for storing input data;
   a data processing unit for processing data stored in said data storage unit;
   a control unit for controlling operations of said data storage unit and said data processing unit in accordance with a program;
   an address modifying means for modifying an address specified by said program for accessing said data storage unit, said address modifying means including an addition means for adding a predetermined addition value to an address specified by said program; and
   an information generating means for generating control information for controlling modification of an address carried out by said address modifying means in accordance with an instruction issued by said program, and comprising:
   a first information holding means for holding information on a range of addresses to be modified;
   a second information holding means for holding said addition value;
   a third information holding means for holding a value for updating said addition value;
   a fourth information holding means for holding the number of times an operation to modify a memory address has been carried out so far; and
   a fifth information holding means for holding a maximum number of times an operation to modify a memory address can be carried out.

2. A data processing apparatus according to claim 1 wherein said address modifying means is provided with an addition means for adding a predetermined addition value to an address specified by said program.

3. A data processing apparatus according to claim 1 wherein said information generating means is further provided with a flag setting/resetting means for setting/resetting a flag on the basis of said addition value held in said second information holding means, said number of times an operation to modify a memory address has been carried out so far held in said fourth information holding means and said maximum number of times an operation to modify a memory address can be carried out held in said fifth information holding means and said program controls said information generating means in accordance with said flag.

4. The data processing apparatus according to claim 1, wherein said data storage unit has at least a read port, a write port, and a FIFO memory area.

5. The data processing apparatus according to claim 4, further comprising a flag setting unit for setting a full area flag when said FIFO memory area is full.

6. A data processing method comprising the steps of:
   a data storing step of storing input data in a data storage unit;
   a data processing step of processing data stored in said data storage unit;
   a control step of controlling operations carried out at said data storage step and said data processing step in accordance with a program;
   an address modifying step of modifying an address specified by said program for accessing said data storage unit, said address modifying step including an addition step of adding a predetermined addition value to an address specified by said program; and
   an information generating step of generating control information for controlling modification of an address carried out by said address modifying step in accordance with an instruction issued by said program, said information generating step comprising the steps of:
   a first information holding step of holding information on a range of addresses to be modified;
   a second information holding step of or holding said addition value;
   a third information holding step of holding a value for updating said addition value;
   a fourth information holding step of holding the number of times an operation to modify a memory address has been carried out so far; and
   a fifth information holding step of holding a maximum number of times an operation to modify a memory address can be carried out.

7. A data processing method according to claim 6 wherein said address modifying step includes an addition step of adding a predetermined addition value to an address specified by said program.

8. A data processing method according to claim 6 wherein said information generating step is further provided with a flag setting/resetting step of setting/resetting a flag on the basis of said addition value held at said second information holding step, said number of times an operation to modify a memory address has been carried out so far held at said fourth information holding step and said maximum number of times an operation to modify a memory address can be carried out held at said fifth information holding step and said program controls said information generating step in accordance with said flag.

9. The data processing method according to claim 6, wherein said data storage unit has at least a read port, a write port, and a FIFO memory area.

10. The data processing method according to claim 9, further comprising a flag setting step of setting a full area flag when said FIFO memory area is full.

* * * * *